Sept. 18, 1923.

F. R. PARKER

VOLTAIC CELL

Original Filed May 8, 1916

1,468,574

WITNESSES:
Otto Kischel
Theodore E. Kischel

INVENTOR
Frederick R. Parker.

Patented Sept. 18, 1923.

1,468,574

UNITED STATES PATENT OFFICE.

FREDERICK R. PARKER, OF CHICAGO, ILLINOIS.

VOLTAIC CELL.

Application filed May 8, 1916, Serial No. 96,067. Renewed September 13, 1922. Serial No. 588,081.

*To all whom it may concern:*

Be it known that I, FREDERICK R. PARKER, a citizen of the United States of America, residing at Chicago, in the county of Cook and State of Illinois, have invented a new and useful Voltaic Cell, of which the following is a specification, reference being had to the accompanying drawings, illustrating the preferred forms of the invention.

The voltaic cell of this invention is an improvement on the voltaic cells set forth in my United States Letters Patents No. 1,182,202, dated May 9, 1916, and No. 1,333,771, dated March 16, 1920, on voltaic cell and battery, the latter patent being a division of the former, both of said patents covering certain features of construction of the present invention. A modified form of the present invention forms the subject-matter of my United States Letters Patent No. 1,366,095, dated Jan. 18, 1921, on voltaic cell and electrode.

The design of the voltaic cell illustrated in this patent forms the subject-matter of my co-pending United States design patent application Serial No. 427,630, filed Dec. 1, 1920, on design for voltaic cells.

My invention relates to voltaic cells and batteries.

The principal objects of my invention are, to provide an improved voltaic cell as herein set forth; to provide improved constructions in voltaic cells as herein set forth; to provide an improved casing for voltaic cells as herein set forth; to provide improved electrodes for voltaic cells as herein set forth; and to provide simplicity of construction, cheapness of manufacture, and efficiency, in the voltaic cells of this invention. Other objects will be apparent from this disclosure of the invention.

Figure 1:
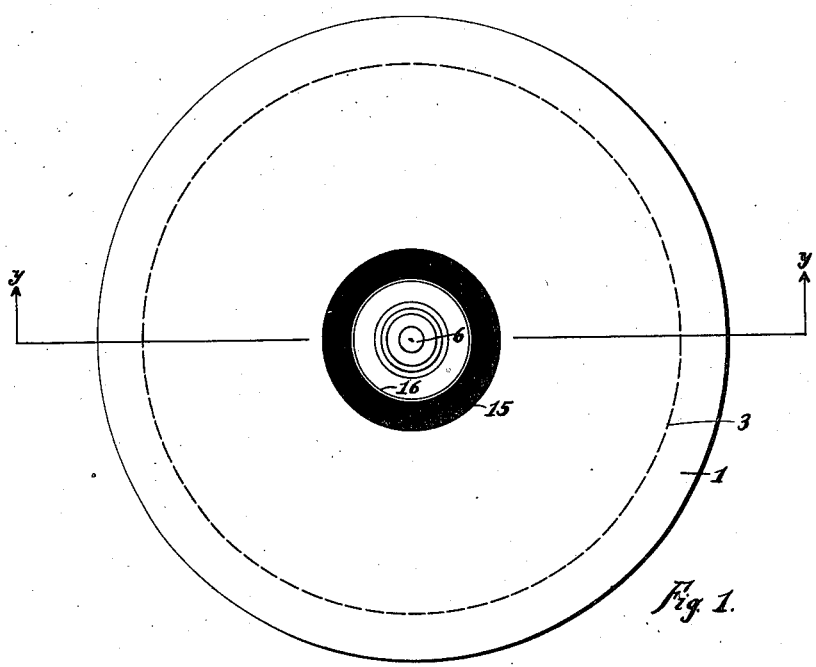
Figure 2:
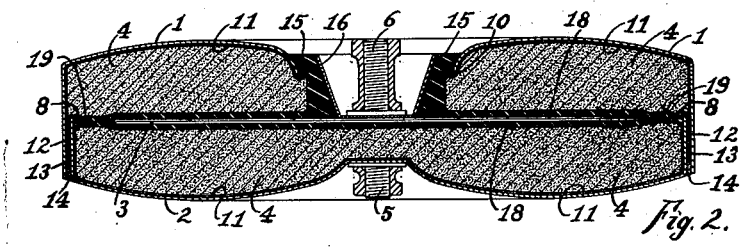
Figure 3:
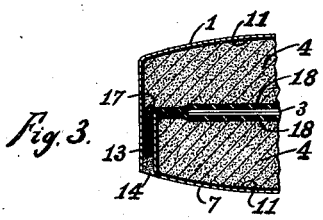
Figure 4:
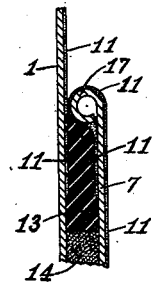
Figure 5:
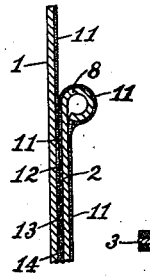
Figure 6:
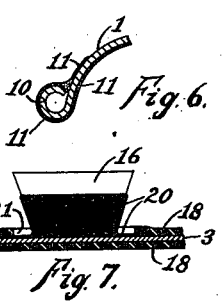
Figure 7:
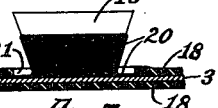

On the accompanying sheet of drawings illustrating the preferred forms of my invention, Figure 1 is a top or plan view of a voltaic cell of the invention; Fig. 2 is a cross-sectional view of the cell of Fig. 1, taken on plane *y—y* of Fig. 1, with portions shown in elevation; Fig. 3 is a cross-sectional view of a portion of a voltaic cell of the invention, taken the same as Fig. 2 and showing a modified construction of the cell; Fig. 4 is an enlarged view of a part of Fig. 3, showing the detail of construction of the exterior wall of this form of cell; Fig. 5 is an enlarged view of a part of Fig. 2, showing the detail of construction of the exterior wall of this form of cell; Fig. 6 is an enlarged view of a part of Fig. 2, showing the detail of construction of the edge of the casing of the cell around the central opening in the casing and Fig. 7 is a sectional elevational view showing the detail of construction of the central portion of the inner electrode of the cell.

Like characters refer to like parts in the several figures.

In the preferred forms of my invention, illustrated in the drawings, the voltaic cell has a two-part casing composed of the saucer-like portions 1 and 2, which casing also serves as an electrode member for the cell, a plate-like electrode 3 disposed medially within the casing 1—2, excitant-depolarizer filling material 4 between the electrodes 1—2 and 3, and suitable terminals 5 and 6 for the respective electrodes 1—2 and 3.

In the cell illustrated in Figs. 1 and 2, the portions 1 and 2 of the casing of the cell are preferably carbonized metal portions formed in saucer-like shapes, one fitting into the other preferably as shown, the portions 1 and 2 being secured together as hereinafter more fully described. If desired, the portion 1 may fit into the portion 2, instead of the construction illustrated. The outer rim of the portion 2 of the casing is preferably rolled over as shown at 8, Fig. 5, to do away with any sharp edge thereof, and for the same reason the inner edge of the portion 1 of the casing, where a hole is provided in the casing for the terminal 6 to project therethrough, is preferably rolled over as shown at 10, Fig. 6. The portions 1 and 2 of the casing are preferably composed of curvilinear portions preferably as shown, so as to provide a curved surface for the top, bottom and outer wall of the cell. These curved surfaces are provided so that the casing 1—2 cannot spring, bulge, or buckle away from the filling material 4 of the cell at any portion of the casing, as it might do if it had flat surfaces. The curvilinear portions also make the casing stronger and more rigid. The terminal 5, preferably a screw post with a nut, is preferably soldered to the portion 2 of the casing as shown. The terminal 5 is preferably short and does not project out farther than the confines of the body of the cell. The casing 1—2 of the cell is preferably the cathode or electro-negative electrode of the cell illustrated.

The carbonized metal portions 1 and 2 which I preferably use for the casing of the cell and also for the electro-negative electrode of the cell, preferably comprise formed sheet-metal portions covered over their interior surfaces with a carbonaceous material impervious to moisture and certain chemical solutions. This carbonaceous covering for the electrode member 1—2 is illustrated in the drawings at 11. The metallic portions 1 and 2 of this electrode member may be of various metals or alloys of metals. Their functions are, primarily, to form rigid supports for the carbonaceous material 11, and preferably good conductors for connecting all portions of the covering 11 of the electrode conductively with the terminal member 5. These metallic portions 1 and 2 I may make of copper, brass, aluminum, zinc, bronze, cold-rolled steel, or various other metals. For an electrode of high conductivity I preferably use copper, and for an electrode of great strength and rigidity together with fair conductivity I preferably use cold-rolled steel electroplated with copper. The electroplating on the metallic portion of the electrode is of further advantage because it presents a rough surface to the carbonaceous covering which holds more securely thereto than to a smooth surface. For the carbonizing covering 11 for the metallic portion of the electrode I use, preferably, a carbonaceous material, such as powdered graphite, carbon dust, powdered charcoal which has been well burned, or other carbonaceous materials, mixed with an adhesive non-conducting material which is impervious to moisture and certain chemical solutions. For such an adhesive impervious material I preferably use a good insulating and waterproof varnish or enamel, or a good grade of shellac, or both. I may, of course, use various suitable varnishes, enamels, glues gums, waxes, cements, paraffine, asphaltum, or other materials, or combinations thereof. I preferably mix the carbonaceous material with the adhesive material so as to form a rather thin mixture, and let this mixture stand until every particle of the carbonaceous material is thoroughly penetrated by the adhesive material or a component part thereof so that there will be no possibility of moisture or certain chemical solutions soaking into or through the particles of the carbonaceous material. I may then apply the mixed carbonizing material 11 to the metallic portions of the electrode with a brush, or by dipping, or by spraying it onto the metallic portions. I may use a carbonizing material which is air-drying, or a material which must be baked after being applied. I may also use one coat or a number of coats of the carbonizing material on the metallic portions of the electrode. I have found that two coats, and even one coat if applied properly, gives very satisfactory results. In applying the carbonizing material with a brush or by dipping, it is important to have it free from air bubbles, which, upon breaking, would leave holes in the carbonizing covering. I may also polish or dress down the carbonized surfaces of the electrode if I desire, to remove the exposed adhesive non-conducting material and present a surface of higher conductivity and a smoother surface if desired. I also contemplate producing the carbonized surfaces of the electrode, in some instances, by an electrolytic process.

The carbonized electrode above described is covered broadly in my United States Letters Patent No. 1,366,095, dated Jan. 18, 1921, on voltaic cell and electrode.

Carbonized high-potential electricity arrester electrodes, constructed as above described, form the subject-matter of my co-pending United States patent application Serial No. 434,414, filed Jan. 3, 1921, on high-potential electricity arrester electrode, which is a division of my United States Letters Patent No. 1,366,095, dated Jan. 18, 1921, on voltaic cell and electrode.

In the voltaic cell illustrated, it can be seen that the carbonizing covering 11 of the electrode 1—2 completely covers the interior surface of the casing 1—2 of the cell, so that there is no possible chance of the filling material 4 or the electrolyte contained therein coming into actual contact with the metal of the portions 1 and 2 of the casing, although the carbonized covering 11 of the electrode serves as a carbon electrode for the cell and conductively connects the filling material 4 with the metallic portion 1—2 of the electrode. This feature of my invention enables me to place the zinc electrode of my cell in the interior thereof, which is important in dry cells on account of the consumption of the zinc and its consequent inferiority for the casing of a voltaic cell. My carbonized electrode 1—2 11 is not consumed as zinc is, in a voltaic cell, and consequently provides a strong durable casing for the contents of the cell, which does not deteriorate nor become eaten through during the life of the cell. The advantages of such an electrode-casing, in voltaic cells and especially in dry cells, can undoubtedly be readily seen.

To make a tight and moisture-proof joint between the portions 1 and 2 of the casing of the cell, where such portions overlap, I preferably provide a construction as shown in Fig. 5. In this construction it will be seen that the carbonizing material 11 extends completely over and around the rolled edge 8 of the portion 2 of the casing, and that the carbonizing material 11 on the two portions 1 and 2 of the casing comes together and extends between the portions 1 and 2 for a little distance as shown at 12. Where the carbonizing material 11 ends, between the portions 1 and 2, the space between 1 and 2 is sealed for a certain distance by an adhesive insulating material 13 which is poured into place in a molten state. This sealing material 13 completely seals over the outer edges of the carbonizing material 11 between the portions 1 and 2 and absolutely prevents any moisture or chemical solution from working out of the cell between the portions 1 and 2 or coming into contact with the metal of the portions 1 and 2. Exterior of the sealing material 13 I preferably further seal the space between the portions 1 and 2 with a low-melting-point metallic solder 14, to firmly and securely hold the portions 1 and 2 of the casing together and electrically connect them with each other. Thus it can be readily seen that this joint when completed is absolutely tight and rigid. The rolled edge 10 of the portion 1 of the casing is also covered by the carbonizing material 11 as shown in Fig. 6, and this edge 10 is then covered by the adhesive insulating sealing material 15 preferably as shown in Fig. 2, so that the cell is sealed perfectly tight between the portion 1 of the casing and the cup-shaped portion 16, and the parts are firmly held in their proper positions.

The cell partially illustrated in Fig. 3 is similar to the cell illustrated in Fig. 2, with the exception of the joint between the portions 1 and 7 of the casing, which joint is shown in detail in Fig. 4. In this modification of the invention the edge 17 of the metallic portion 7 of the casing of the cell is rolled outwardly instead of inwardly as in Figs. 2 and 5. This construction gives a wider space between the parts 1 and 7 for the adhesive insulating sealing material 13 and the metallic solder 14 which are applied substantially as described in connection with the construction of Figs. 2 and 5. It will be noted that in Fig. 4 the carbonizing material 11 extends completely over and around the rolled edge portion 17.

The excitant-depolarizer filling material 4 may be a mixture of powdered graphite or carbon dust, or both, with manganese-dioxide, salammoniac, and water, preferably as chemically pure as possible, or some other suitable chemical mixture. When I use graphite as the carbonizing material 11 on the electrode 1—2 I preferably use graphite in the filling material 4.

The adhesive insulating sealing material 13 and 15 may be a mixture of pitch and glue, or various other materials or compounds. The material 13 and 15 is preferably in a thin molten state when poured into the cell to seal same.

The electrode 3 preferably comprises a zinc plate or disk 3. Rather thick porous pulp-board disks 18 18 are placed on opposite sides of the zinc plate 3 to keep the filling material 4 out of actual contact with the zinc plate 3. The pulp-board disks 18 18 are preferably considerably larger than the electrode 3 so that they extend over the outer edge of the disk 3 and come into contact with each other as shown at 19. This construction completely separates the zinc plate 3 from the solid portions of the filling material 4 which would cause a short-circuit of the cell if they come into contact with the zinc 3. The outer edge of the plate 3 is preferably rounded off or thinned down as shown, to do away with the sharp corners thereof and permit the disks 18 18 of non-conducting material to fit together better over the edge of the plate 3. I may use various materials for the disks 18 18, and in some forms of my cell I may use other materials besides zinc for the inner electrode 3 of the cell.

The metallic cup-shaped portion 16 is preferably soldered to the center of the electrode 3, and the terminal post 6, which is preferably a long screw post with a long nut, is preferably soldered into the cup-shaped portion 16 as shown. The center of the upper disk 18 of Fig. 2 is cut away as shown at 21 in Fig. 7, so that this disk 18 may be placed down over the cup-shaped portion 16 as shown. A portion of the exterior of the cup-shaped portion 16 and a portion of the upper surface of the zinc disk 3, adjacent the portion 16 and extending a short distance under the inner edge 21 of the upper disk 18, are insulated with an adhesive insulating varnish as shown at 20, so that there is no possible chance of the filling material 4 or the moisture or chemical solution contained therein, coming into contact with any metal portion of the electrode member 3 16 at these parts.

As the electrode 1—2 of my improved cell of this invention does not take up as much space as a purely carbon electrode would, which would necessarily be a great deal thicker than my carbonized electrode, I am enabled, by the use of my improved carbonized electrode 1—2, to make my voltaic cell considerably thinner than otherwise. Furthermore, with my improved carbonized electrode 1—2, there is no possible chance of the electrolyte in the filling material 4 soaking its way to the terminal post 5 and thereby setting up a detrimental chemical action in the cell, as may be the case with an ordinary voltaic cell in which the terminal post is connected directly to the carbon. My improved carbonized electrode eliminates the necessity of any special treating of the carbon, as where carbon alone is used.

I prefer graphite to carbon, as a carbonizing material for my electrode 1—2, because it is not as porous as carbon, is a better conductor of electricity, and forms a smoother and more compact covering. The graphite may also be more readily dressed down or polished than carbon. The use of graphite in the filling material 4 of my cell, together with my improved carbonized electrode 1—2 coated with a graphite mixture, and being of higher conductivity and having a larger extent of surface than an ordinary carbon electrode, provides a voltaic cell of very low internal resistance and consequently a cell of very high amperage. With such a cell weighing about three-fourths as much as the standard No. 6 dry cell, I have gotten more than fifty amperes of current on short-circuit, as against a maximum of thirty-three amperes on short-circuit of a No. 6 dry cell on a test of a number of No. 6 cells. With my improved voltaic cell, having such a low internal resistance, the wattage loss in the cell, on usage, is considerably less than in the ordinary No. 6 dry cell, with the same current, and consequently the wattage supplied to the external circuit is greater with my cell, and this with a cell much lighter in weight than the ordinary. I can, of course, increase the internal resistance of my cell if this is desired in manners well understood.

The long terminal post 6 with the long nut thereon is provided on my cells for the purpose of connecting two or more of the cells together to form a battery, as set forth in my United States Letters Patent No. 1,182,202, dated May 9, 1916, on voltaic cell and battery, above mentioned.

The process of manufacturing my improved voltaic cell from its component parts consists of the following:—

The terminals 5 and 6 having been properly soldered to their respective electrodes 2 and 3 as above set forth, in the manufacture of these electrodes, the saucer-shaped portions 1 and 2 of the casing of the cell, properly coated with the carbonizing material 11 as above set forth, are now placed on a table with the rims thereof projecting upwardly and are filled to the proper depth with the moist excitant-depolarizer material 4, preferably with the aid of a filling machine. Then the pulpboard disks 18 18 are placed on top of the respective filled saucer-shaped portions 1 and 2. Then the electrode 3 is placed on top of the pulp-board disk 18 in the saucer-shaped portion 1 of the casing, the terminal 6 and the cup-shaped portion 16 projecting down through the central opening in the filled portion 1 of the casing. Then the two halves of the cell are placed together as shown in Fig. 2 of the drawings, the rim of the portion 2 of the casing slipping into the portion 1 of the casing preferably as shown Then the cell as a whole is put into a press and the halves thereof are pressed together the required amount to properly compress the filling material 4 and reduce the internal resistance of the cell to the required value, the internal resistance of the cell being measured as the pressure is applied. Then when the cell is compressed the required amount the space between the portions 1 and 2 (or 1 and 7) of the casing is sealed at 13 and the portions 1 and 2 (or 1 and 7) are soldered together at 14, as above set forth, entirely around the cell, while the cell is held under the required pressure. Then, finally, the cell is set upright and the sealing material 15 is heated and poured into place around the cup-shaped portion 16 as shown. During the manufacture of the cell I preferably insert a hollow cylindrical portion of insulating material into the central opening in the portion 1 of the casing, far enough to hold the inner wall of the filling material 4 in the portion 1 in place, the cup-shaped portion 16 with its terminal 6 extending into this hollow cylindrical portion when the electrode 3 is put in place on the half 1 of the cell. This hollow cylindrical portion also serves as a guide for centering the apertured disk 18 and the electrode 3 on the material 4 in the portion 1 of the casing.

By the process described immediately above, the cells may be very readily and easily manufactured, and may be made exceedingly uniform in resistance and electrical output. My cells, constructed in this manner, are very rigid and substantial and are not easily damaged in handling.

The above-described process of constructing my voltaic cells forms the subject-matter of my copending United States patent application Serial No. 432,027, filed Dec. 20, 1920, on process of producing uniform voltaic cells, which is a division of my United States Letters Patent No. 1,366,095, dated Jan. 18, 1921, on voltaic cell and electrode.

Electrical conductors may be connected with the terminal posts 5 and 6 of the cell, under the respective nuts carried by the posts, in a manner well understood.

I wish it to be understood that I do not desire to limit this invention to the particular details of construction, nor to the particular materials, herein set forth, as various modifications thereof may be made or utilized without departing from the scope of the appended claims. I also wish it to be understood that the several features of the invention may be utilized either singly or collectively without departing from the scope of the appended claims.

What I claim herein as my invention is;

1,468,574

1. A voltaic cell having a metallic casing for the contents of the cell, the said casing being carbonized on the interior thereof and utilized as the carbon electrode of the cell, a zinc electrode disposed medially within the casing, a suitable porous covering of non-conducting material for the zinc electrode, and suitable excitant-depolarizer material between the electrodes.

2. A voltaic cell having a casing composed of two saucer-like portions, the rim of one saucer-like portion being rolled over and extending into the other saucer-like portion, insulating sealing material sealing the space between the rims of the saucer-like portions, and metallic solder soldering the saucer-like portions together.

3. A voltaic cell having an electrode comprising a casing for the contents of the cell composed of two metallic saucer-like portions, the rim of one saucer-like portion being rolled over and extending into the other saucer-like portion, carbonizing material covering the inner surfaces of the saucer-like portions and extending over the rolled rim of the one saucer-like portion, insulating sealing material sealing the space between the rims of the saucer-like portions, and metallic solder soldering the saucer-like portions together.

4. A voltaic cell having a casing composed of two saucer-like portions, the rim of one saucer-like portion being rolled over and extending into the other saucer-like portion, the space between the rims of the saucer-like portions being sealed and the saucer-like portions having direct electrical connection with each other.

5. A voltaic cell having an electrode comprising a metallic casing for the contents of the cell covered on the interior thereof with carbonaceous material.

6. A voltaic cell having an electrode comprising a metallic casing for the contents of the cell covered on the interior thereof with a mixture of carbonaceous material and adhesive non-conducting material impervious to moisture applied directly to the metallic casing.

7. A cake-like voltaic cell having a carbonized metallic casing for the contents of the cell constituting one of the electrodes thereof, a plate-like zinc electrode concentrically located within the said casing and medially disposed therein with respect to the thickness of the cell, a porous lining of non-conducting material for the said medially-disposed electrode, excitant-depolarizer material filling the said casing on both sides of the said medially-disposed electrode, and means on opposite sides of the cell for making electrical connections with the respective electrodes.

8. A cake-like voltaic cell having a carbonized metallic casing for the contents of the cell constituting one of the electrodes thereof, a plate-like electrode concentrically located within the said casing and medially disposed therein with respect to the thickness of the cell, excitant material within the said casing on both sides of the said medially-disposed electrode, and suitable terminals for the electrodes.

9. A disk-shaped voltaic cell having a carbonized metallic casing for the contents of the cell constituting one of the electrodes thereof, a plate-like zinc electrode disposed medially within the said casing with respect to the thickness of the cell, a porous lining of non-conducting material for the said medially-disposed electrode, excitant-depolarizer material filling the said casing on both sides of the said medially-disposed electrode, and means on opposite sides of the cell for making electrical connections with the respective electrodes.

10. A disk-shaped voltaic cell having a carbonized metallic casing for the contents of the cell constituting one of the electrodes thereof, a plate-like electrode disposed medially within the said casing with respect to the thickness of the cell, excitant material within the said casing on both sides of the said medially-disposed electrode, and suitable terminals for the electrodes.

11. In a voltaic cell having greater breadth than height when in an upright position, a carbonized metallic casing for the contents of the cell constituting one of the electrodes thereof, a plate-like zinc electrode for the cell disposed horizontally therein and medially with respect to the top and bottom of the cell when the cell is in said upright position, a porous lining of non-conducting material for the said medially-disposed electrode, excitant-depolarizer material filling the said casing on both sides of the said medially-disposed electrode, and means on opposite sides of the cell for making electrical connections with the respective electrodes.

12. In a voltaic cell having greater breadth than height when in an upright position, a carbonized metallic casing for the contents of the cell constituting one of the electrodes thereof, a plate-like electrode for the cell disposed horizontally therein and medially with respect to the top and bottom of the cell when the cell is in said upright position, excitant material within the said casing on both sides of the said medially-disposed electrode, and suitable terminals for the electrodes.

13. A voltaic cell having an electrode comprising a casing for the contents of the cell composed of two metallic saucer-like portions, the rim of one saucer-like portion being rolled over and extending into the other saucer-like portion, carbonizing material covering the inner surfaces of the saucer-like portions and extending over the rolled rim of the one saucer-like portion, the space between the rims of the saucer-like portions being sealed and the saucer-like portions having direct electrical connection with each other.

14. A battery electrode portion comprising a sheet-metal portion having a covering of carbonaceous material, the edge of the sheet-metal portion being formed into a roll and the said carbonaceous material covering the roll.

15. A voltaic cell having an electrode comprising a sheet steel casing for the contents of the cell electroplated on the interior thereof with copper and having a covering comprising a mixture of carbonaceous material and adhesive non-conducting material impervious to moisture over the copper.

16. A voltaic cell having an electrode comprising a sheet steel casing for the contents of the cell electroplated on the interior thereof with copper and having a covering of carbonaceous material over the copper.

17. A voltaic cell having an electrode comprising a metallic casing for the contents of the cell electroplated on the interior thereof with metal and having a covering of carbonaceous material over the electroplating.

18. A voltaic cell having an electrode comprising a metallic casing for the contents of the cell covered on the interior thereof with a mixture of carbonaceous material and adhesive non-conducting material impervious to moisture, the exposed surface of the said covering being polished.

19. A voltaic cell having an electrode comprising a metallic casing for the contents of the cell covered on the interior thereof with a mixture of carbonaceous material and adhesive non-conducting material impervious to moisture, the exposed surface of the said covering being dressed down to remove the exterior of the said non-conducting material.

20. A voltaic cell having an electrode comprising a metallic casing for the contents of the cell covered on the interior thereof with a mixture of carbonaceous material and adhesive material, the exposed surface of the said covering being dressed down to provide a fresh surface of the required finish.

21. A voltaic cell having a casing constituting an electrode for the cell, a zinc plate disposed medially within the casing, portions of porous non-conducting material on opposite sides of the zinc plate and covering same, and suitable excitant material between the zinc plate and casing.

As inventor of the foregoing I hereunto subscribe my name, this 6th day of May, 1916.

FREDERICK R. PARKER.

Witnesses:
OTTO KISCHEL,
THEODORE E. KISCHEL.